US012043525B1

(12) United States Patent
Mart

(10) Patent No.: US 12,043,525 B1
(45) Date of Patent: Jul. 23, 2024

(54) LIFTING APPARATUS MOUNTABLE ON A WALL

(71) Applicant: Tanner E. Mart, Vermillion, SD (US)

(72) Inventor: Tanner E. Mart, Vermillion, SD (US)

( * ) Notice: Subject to any disclaimer, the term of this patent is extended or adjusted under 35 U.S.C. 154(b) by 0 days.

(21) Appl. No.: 17/858,584

(22) Filed: Jul. 6, 2022

(51) Int. Cl.
*B66C 23/20* (2006.01)

(52) U.S. Cl.
CPC ........ *B66C 23/208* (2013.01); *B66C 2700/03* (2013.01)

(58) Field of Classification Search
CPC .......................... B66C 23/208; B66C 2700/03
See application file for complete search history.

(56) References Cited

U.S. PATENT DOCUMENTS 2,496,401 A * 2/1950 McKinney .............. B66C 23/36 212/252
3,978,989 A * 9/1976 Avila, Jr. .............. B66C 23/205 212/176
5,147,013 A * 9/1992 Olson ...................... A62B 1/08 182/236
6,135,300 A * 10/2000 Fox ....................... B66C 23/208 182/60
7,523,834 B2 4/2009 Leinonen
7,537,088 B2 * 5/2009 Spitsbergen .......... B66C 23/208 187/241
8,550,266 B2 10/2013 Settlemier
10,865,076 B1 12/2020 Schrank
11,352,239 B1 * 6/2022 Spitsbergen .......... B66C 23/203
2005/0051507 A1 * 3/2005 Haliburda ............. B66C 23/208 212/179

FOREIGN PATENT DOCUMENTS

| | | |
|---|---|---|
| CN | 109052192 | 12/2018 |
| CN | 107473101 | 6/2019 |
| CN | 112607617 | 4/2021 |
| JP | 6418321 | 11/2018 |
| WO | 9204270 | 3/1992 |

* cited by examiner

*Primary Examiner* — Michael R Mansen
*Assistant Examiner* — Juan J Campos, Jr.
(74) *Attorney, Agent, or Firm* — Jeffrey A. Proehl; Woods, Fuller, Shultz & Smith, PC

(57) ABSTRACT

A lifting apparatus for mounting on an upper edge of a wall to transfer an item from a location on a first side of the wall to a location on a second side of the wall. The lifting apparatus may include a wall mounting assembly configured removably mounting on a portion of the wall including and adjacent to the upper edge of the wall. The wall mounting assembly may include a saddle structure configured to create a receiving space for receiving the upper edge of the wall and a portion of the wall adjacent to the upper edge of the wall. The lifting apparatus may also include a davit assembly mounted on the wall mounting assembly and configured to facilitate lifting of an item adjacent to a wall on which the wall mounting assembly is mounted.

20 Claims, 5 Drawing Sheets

LIFTING APPARATUS MOUNTABLE ON A WALL

BACKGROUND

Field

The present disclosure relates to lifting apparatus and more particularly pertains to a new lifting apparatus mountable on a wall for assisting in the movement of items from one side of the wall to another side of the wall.

SUMMARY

In one aspect, the present disclosure relates to a lifting apparatus for mounting on an upper edge of a wall to transfer an item from a location on a first side of the wall to a location on a second side of the wall. The lifting apparatus may comprise a wall mounting assembly configured removably mounting on a portion of the wall including and adjacent to the upper edge of the wall. The wall mounting assembly may include a saddle structure configured to create a receiving space for receiving the upper edge of the wall and a portion of the wall adjacent to the upper edge of the wall. The lifting apparatus may comprise a davit assembly mounted on the wall mounting assembly and configured to facilitate lifting of an item adjacent to a wall on which the wall mounting assembly is mounted.

In another aspect, the disclosure relates to a system may comprise a wall having an upper edge, a first side, and a second side; and a lifting apparatus removably mounted the wall and configured to transfer an item from a location on a first side of the wall to a location on a second side of the wall. The lifting apparatus may comprise a wall mounting assembly removably mounted on a portion of the wall including and adjacent to the upper edge of the wall. The wall mounting assembly may include a saddle structure configured to create a receiving space receiving the upper edge of the wall and a portion of the wall adjacent to the upper edge of the wall. The lifting apparatus may also include a davit assembly mounted on the wall mounting assembly and configured to facilitate lifting of an item adjacent to the wall on which the wall mounting assembly is mounted.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
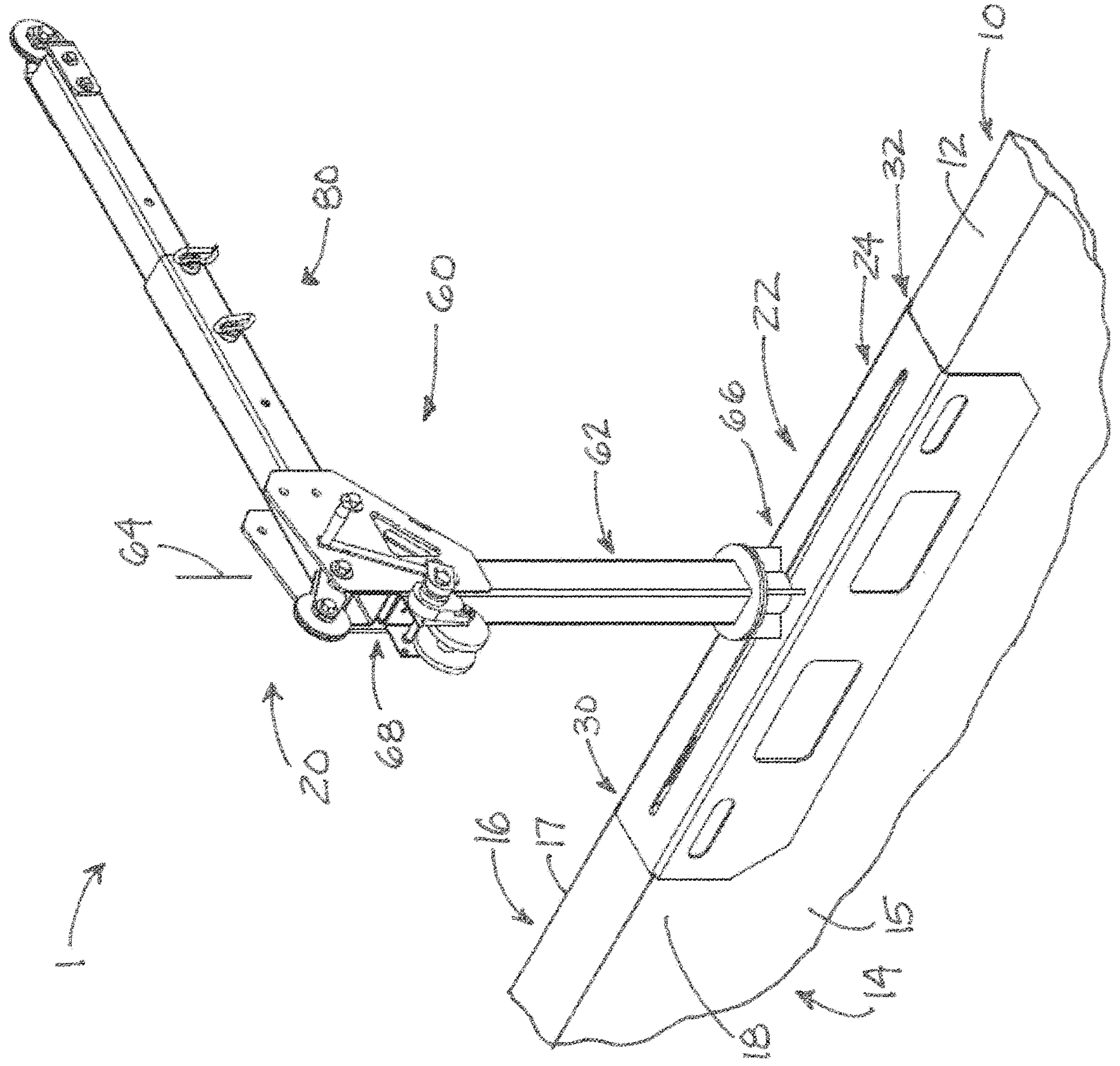
FIG. 1 is a schematic perspective view of a system including a new lifting apparatus mounted on a wall according to the present disclosure.
Figure 2:
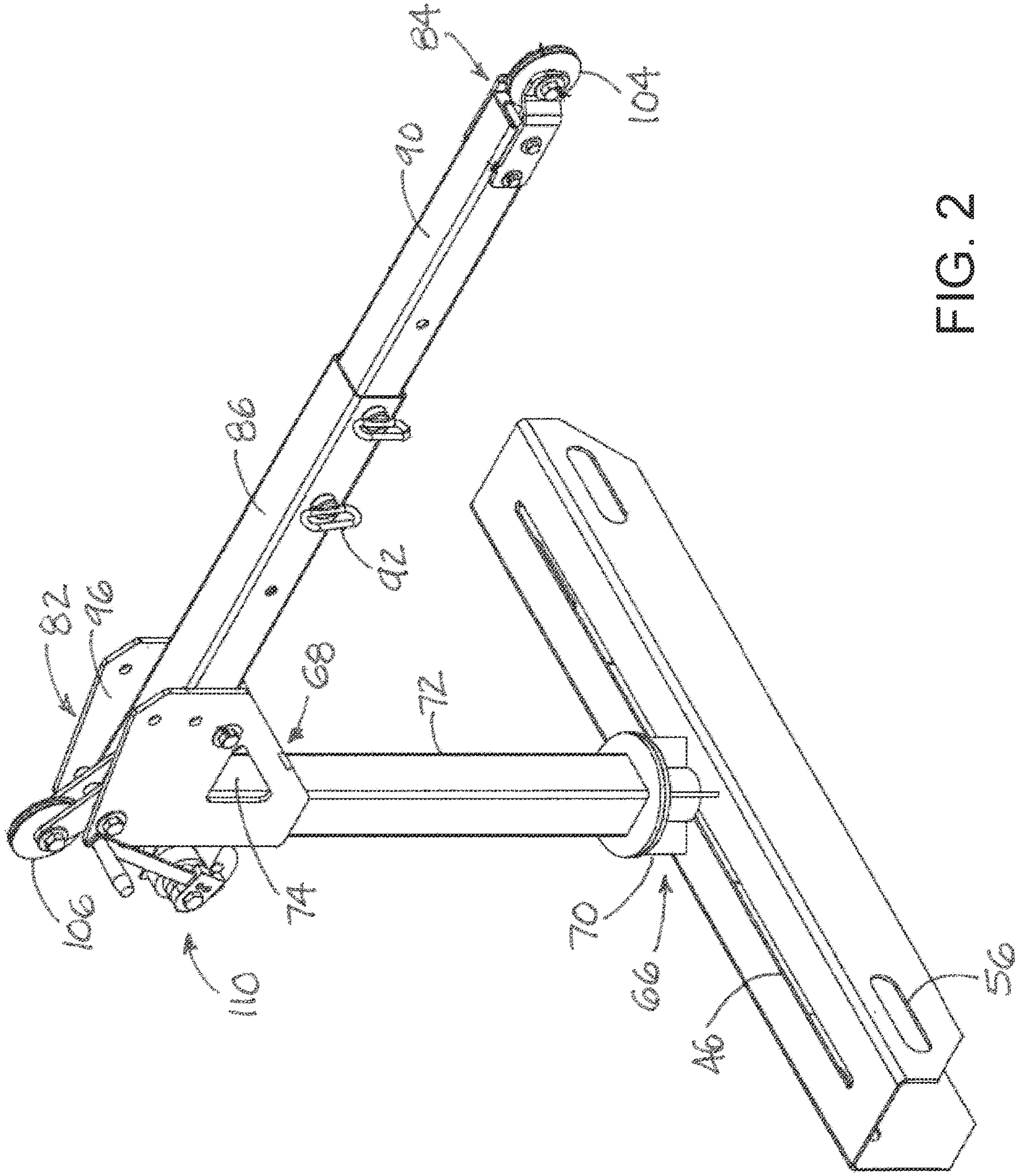
FIG. 2 is a schematic perspective view of the wall-mountable lifting apparatus, according to an illustrative embodiment.
Figure 3:
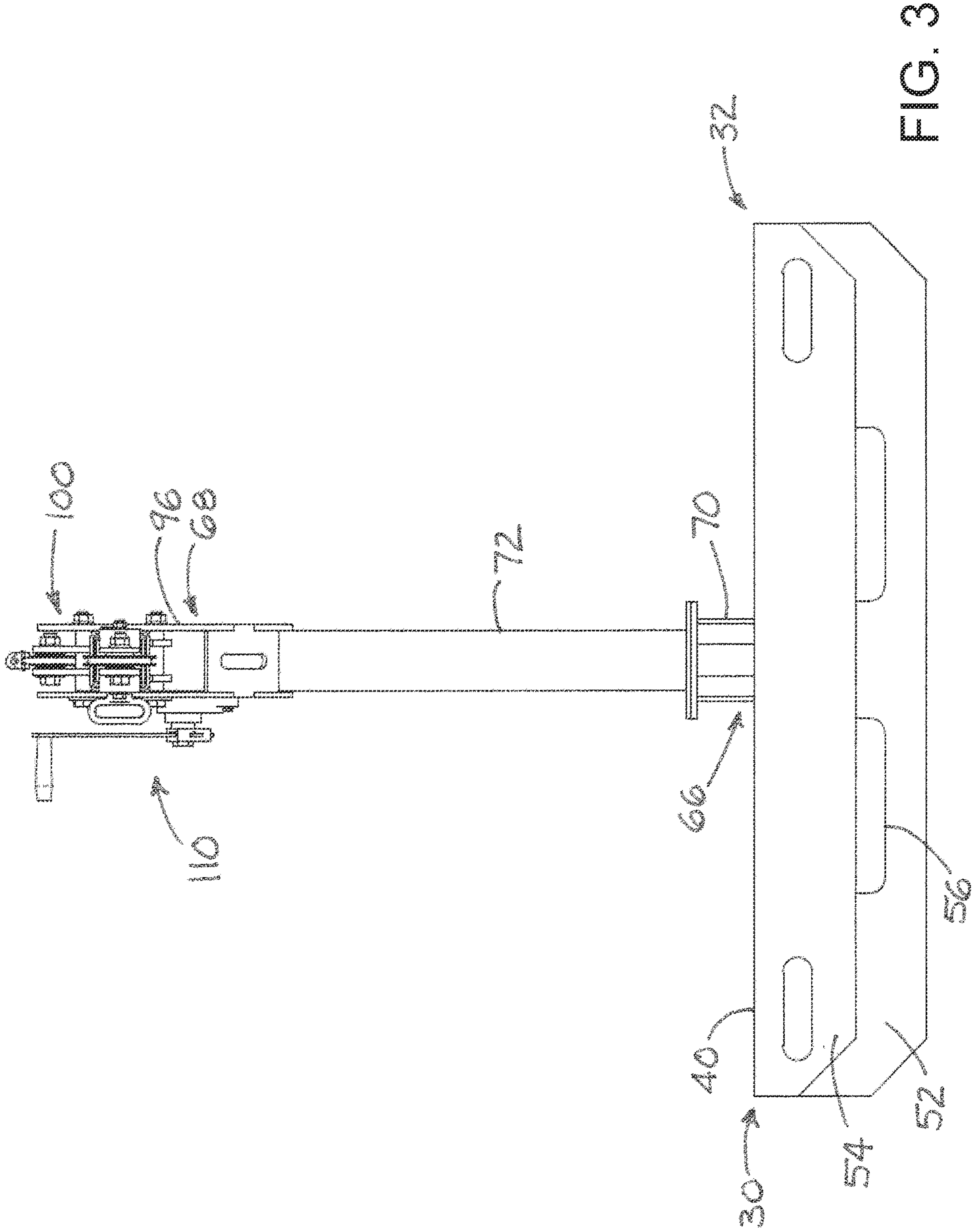
FIG. 3 is a schematic front view of the lifting apparatus according to an illustrative embodiment.
Figure 4:
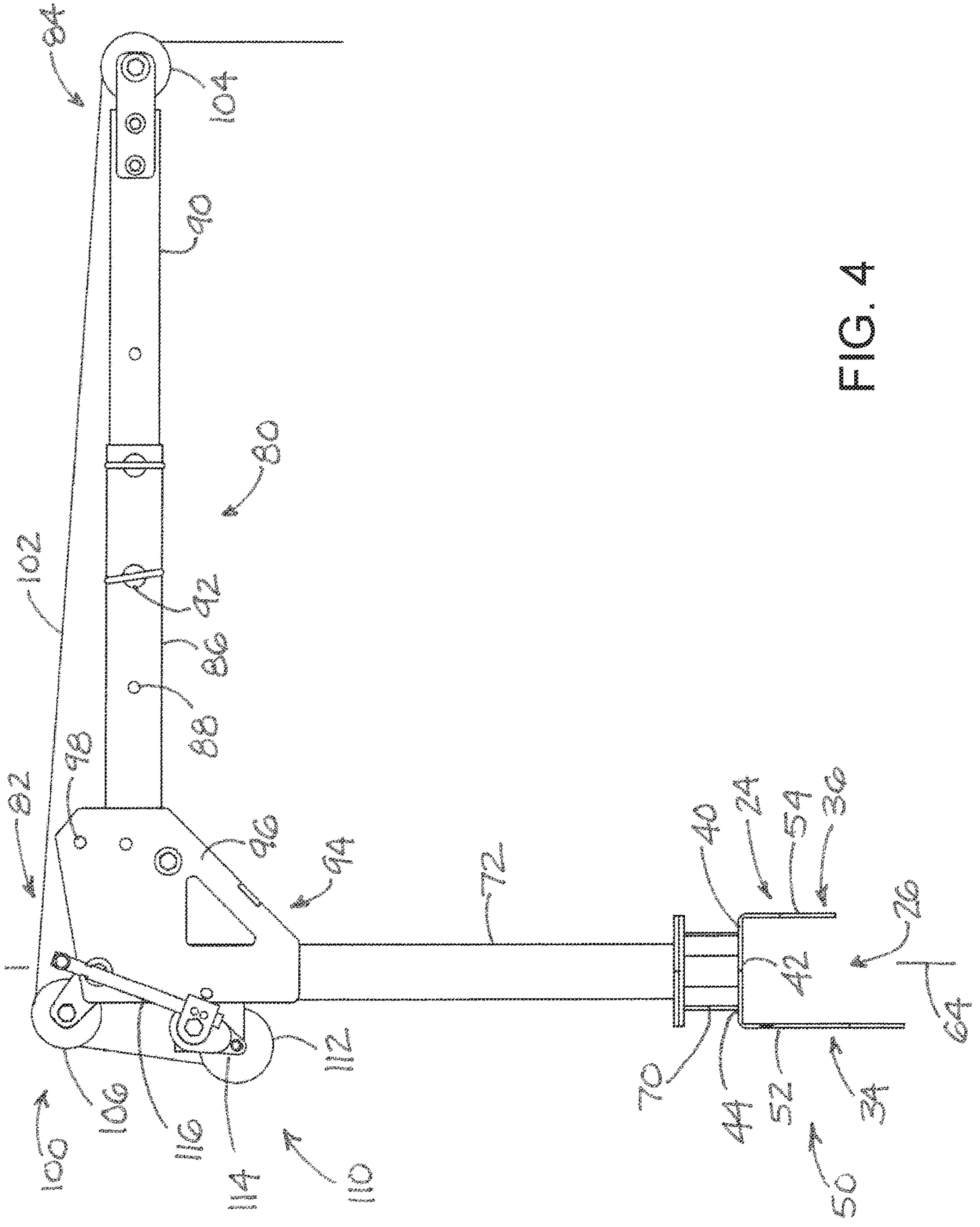
FIG. 4 is a schematic side view of the lifting apparatus according to an illustrative embodiment.

With reference now to the drawings, and in particular to FIGS. 1 through 5 thereof, a new lifting apparatus mountable on a wall embodying the principles and concepts of the disclosed subject matter will be described.

The applicant has recognized that on construction sites, and in particular construction sites for building structures which rest upon a foundational or basement wall, it is not uncommon to have construction materials and construction equipment remaining inside the perimeter of the wall once the (e.g., concrete or masonry) wall has been completed. In most circumstances, the construction equipment and excess construction materials within the perimeter of the wall must be removed from the crawlspace or basement space before further operations, such as placement of the concrete for the basement floor slab and/or capping of the wall may be performed. Moreover, and in particular when the wall surrounds a basement, the construction equipment and materials may be located at a level that is significantly lower than the ground surface surrounding the wall which may make the task of removal more difficult, particularly since no permanent means of egress (e.g., stairs) usually exist between the basement floor level and the ground level at this stage of the construction process.

The applicant has developed a lifting apparatus to assist in the movement of construction materials and equipment from within the walled space which may advantageously take advantage of the structure provided by the wall to support the lifting apparatus while the lifting apparatus is being utilized, while also facilitating mounting of the lifting apparatus on the wall structure and also removal of the lifting apparatus from the wall structure. The lifting apparatus may also permit fewer personnel to perform the removal operation than otherwise would be necessary in the absence of the lifting apparatus.

In some aspects, the disclosure relates to a system 1 which generally includes a wall 10 and a lifting apparatus 20 mounted on the wall. In other aspects, the disclosure relates to a lifting apparatus 20 alone which is highly suitable for mounting on a wall 10.

In greater detail, the wall 10 may have an upper edge 12 with a surface which may extend in a substantially horizontally plane. Illustratively, the wall 10 may be a foundation wall of a building structure, and particularly of a building structure under construction in which the upper edge 12 of the wall has not yet been built upon and is exposed. For example, the wall 10 may be formed by concrete or may be formed by masonry block, and in such implementations the upper edge may be formed by the upper surface of the concrete wall slab or masonry wall block. The wall 10 may have a first side 14 and a second side 16, and illustratively the first side may be directed towards dirt or fill material positioned about the foundation wall the second side may also be directed towards dirt or fill material or may be directed towards the crawl space or basement space. For the purposes of illustration of the use, the lifting apparatus 20 may be employed to remove items from the second side 16 of the wall to the first side 14 of the wall. Additionally, the wall 10 may have a first side surface 15 on the first side of the wall and a second side surface 17 on the second side of the wall.

The lifting apparatus 20 may be mountable on the wall 10, and typically is removably mountable on a wall for relatively temporary mounting on the wall for use in moving construction materials or construction related items between the first and second sides of the wall. Illustrative embodiments of the lifting apparatus 20 include a wall mounting assembly 22 which is configured to mount on the wall 10, such as on a location on the wall adjacent to and contacting the upper edge 12 of the wall. In such a relationship, the lifting apparatus 20 may be supported and anchored in position on the wall to thereby provide the lifting apparatus with support and stability derived from the wall.

In greater detail, the wall mounting assembly 20 may comprise a saddle structure 24 for engaging the upper edge 12 of the wall and also for engaging a portion 18 of the wall located adjacent to the upper edge of the wall. The saddle structure 24 may be configured to create or define a receiving space 26 which receives a portion of the wall 10 located adjacent to the upper edge of the wall that is inserted into the space 26 upon mounting of the apparatus 20 on the wall. The saddle structure 24 may be elongated in shape and extend between opposite ends which include a first end 30 and a second end 32. In addition to the ends 30, 32, the saddle structure has opposite lateral sides 34, 36.

The saddle structure 24 may include a primary portion 40 which is positionable adjacent to the upper edge 12 of the wall and has an inward face 42 for positioning against the upper edge of the wall. The primary portion 40 extends from the first end 30 to the second end 32 of the saddle structure. The primary portion 40 may comprise a primary member 44 which may be substantially planar in shape. One or more apertures 46 may be formed in the primary portion for receiving a fastener passing through the aperture and extending into the wall to provide a degree of securement to the wall, and in some implementations the aperture may comprise an elongated slot that extends longitudinally on the primary member.

The saddle structure 24 may also include a secondary portion 50 which is positionable adjacent to the sides 14, 16 of the wall which are located adjacent to the upper edge 12. In illustrative embodiments, the secondary portion 30 may include a pair of secondary members 52, 54, with each of the secondary members being positionable adjacent to one of the side surfaces 15, 17 of the wall. Each of the secondary members 52, 54 may extend from the primary member 44 in a laterally spaced and substantially parallel orientation to create the receiving space 26 with the primary member 44. Each of the secondary members 52, 54 may be substantially planar in shape. In the illustrative embodiments, a first one 52 of the secondary members may extend from the primary member a distance that is different than a distance which a second one 54 of the secondary members extend from the primary member, which may facilitate the act of positioning the saddle structure on the upper portion of the wall. At least one aperture 56 may be formed in at least one of the secondary portions for receiving a fastener passing through the aperture and into the wall.

The lifting apparatus 20 may also include a davit assembly 60 mounted on the wall mounting assembly 22 and configured to facilitate lifting of items (such as construction equipment and/or materials) adjacent to the wall on which the wall mounting assembly is mounted. The davit assembly 60 may include a stanchion structure 62 that extends substantially vertically upwardly from the wall mounting assembly 22. The stanchion structure 62 may be elongated along a stanchion axis 64 which may be substantially vertically oriented. The stanchion structure 62 has a lower end 66 and an upper end 68, with the lower end 66 of the stanchion structure being united to the wall mounting assembly 22.

The stanchion structure 62 may include a base portion 70 which may be fixedly mounted on the wall mounting assembly 22 so as not to move with respect to the assembly 22. The stanchion structure 62 may also include a post portion 72 that is movably mounted on the base portion 70, and may be rotatable about the stanchion axis 64 with respect to the base portion 70. The post portion 72 has an upper section 74.

The davit assembly 60 may also comprise a jib structure 80 which is mounted on the stanchion structure 62 and may extend substantially horizontally outward from the structure 62. The jib structure 80 has a proximal end 82 located adjacent to the stanchion structure and a distal end 84 located opposite of the proximal end 82. The jib structure 80 may include an inboard portion 86 which may be substantially horizontally oriented. The inboard portion 86 may have a hollow section. The inboard portion 86 may have at least one set of extension adjustment holes 88, and may have multiple sets of extension adjustment holes to provide a plurality of adjustable positions.

The jib structure 80 may further include an outboard portion 90 that is mounted on the inboard portion 86 and may be longitudinally movable with respect to the inboard portion to adjust a distance between the proximal 82 and distal 84 ends of the jib structure to increase or decrease the reach distance of the jib structure. In some embodiments, the outboard portion 90 may be telescopically mounted on the inboard portion 86, and illustratively a section of the outboard portion may be slidably received in the hollow section of the inboard portion.

The outboard portion 90 may have at least one set of extension adjustment holes that is alignable with at least one set of extension adjustment holes of the inboard portion, and in the illustrative embodiments at least one of the portions 86, 90 has multiple sets for providing multiple length adjustments. The jib structure 80 may also include at least one position securing pin 92 removably extended through a set of extension adjustment holes in the inboard portion aligned with a set of extension adjustment holes in the outboard portion to selectively fix a position of the outboard portion with respect to the inboard portion. Optionally, both portions 86, 90 may have multiple sets of holes arranged so that more than one set of holes may be aligned simultaneously and a pin extended through each respective set of the aligned holes.

The lifting apparatus 20 may also include an attachment structure 94 for attaching the jib structure to the stanchion structure, and the attachment structure 94 may permit the jib structure to move or pivot with respect to the stanchion structure to permit folding of the jib structure into a collapsed condition with respect to the stanchion structure for facilitating transport and storage of the lifting apparatus. The attachment structure 94 may also permit a degree of adjustment of the position or orientation of the jib structure 80 with respect to the stanchion structure 62. In the illustrative embodiments, the attachment structure may comprise a pair of attachment members 96 which may be positioned on opposite sides of the stanchion structure and opposite sides of the jib structure such that the structures 62, 80 are positioned between the members 96, and the attachment members 96 extend substantially parallel to each other. The attachment members 96 may have at least two sets of elevation adjustment holes 98, each set of elevation adjustment holes providing a distinct elevation position of the jib structure with respect to the stanchion structure. A fastener may be passed through a set of the elevation adjustment holes, and the inboard portion may rest upon the fastener to support the inboard portion at the desired elevation, or optionally holes may be formed in the inboard portion to receive a portion of the fastener.

The lifting apparatus 20 may also include rigging support structure 100 that is configured to support an elongate member 102 (such as a rope or cable) with respect to the jib structure 80. The rigging support structure 100 may include an outboard pulley 104 mounted on the outboard portion 90 of the jib structure, such as at the distal end 84 of the jib structure. The rigging support structure 100 may also include an inboard pulley 106 mounted on the inboard portion 86 of the jib structure, such as at the proximal end 82 of the jib structure.

In some embodiments, the lifting apparatus 20 may also include rigging operating structure 110 which is configured to move the elongate member 102 with respect to the rigging support structure 100. Illustratively, the rigging operating structure 110 may include a spool 112 that is mounted for rotation with respect to elements of the stanchion structure 62, a spool mount 114 mounted on the stanchion structure and having the spool 112 rotatably mounted thereon, and a spool crank 116 which is configured to rotate the spool with respect to the spool mount when the spool crank is operated by the hand of a user.

In an illustrative embodiment, the saddle structure 24 may be configured so that the receiving space 26 has a width of approximately 7 inches to approximately 8 inches, and a length of approximately 60 inches, and a minimum depth of approximately 7 inches. The stanchion structure may have a height above the saddle structure of approximately 46 inches, and the jib structure may have a length of approximately 42 inches to approximately 68 inches.

Figure 5:
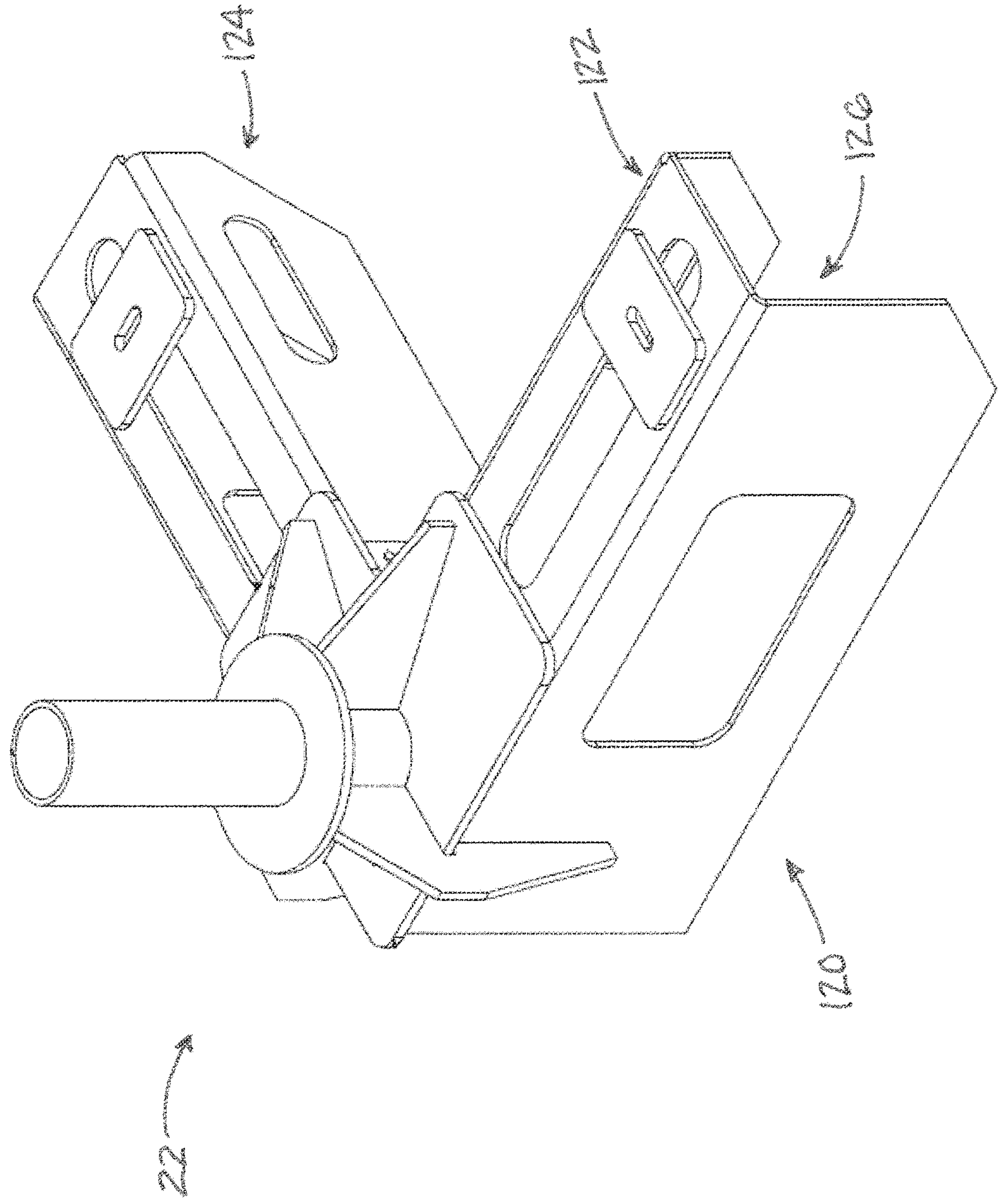
FIG. 5 is a schematic perspective view of an optional wall mounting assembly of the lifting apparatus, according to an illustrative embodiment.

Other configurations of the wall mounting assembly 22 may be provided to adapt to different wall configurations to provide greater positioning flexibility in positioning and provide greater support of the saddle structure and the davit assembly. In embodiments of the wall mounting assembly having an optional configuration, such as shown in FIG. 5, the saddle structure may be configured to be mounted on a portion of the wall 10 that incorporates a corner of the wall, in which portions of the wall intersect at an angle that is substantially perpendicular to each other. The saddle structure 120 may having two saddle portions 122, 124 that are oriented at an angle to each other, such as a perpendicular angle, such that the receiving space 126 is suitable to receive a portion of the wall having a corner.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A lifting apparatus for mounting on an upper edge of a wall to transfer an item from a location proximate to a first side of the wall to a location proximate to a second side of the wall, the lifting apparatus comprising:

a wall mounting assembly configured for removably mounting on a portion of the wall adjacent to the upper edge of the wall, the wall mounting assembly including a saddle structure configured to create a receiving space for receiving the upper edge of the wall and a portion of the wall adjacent to the upper edge of the wall, the saddle structure being elongated in a direction extending parallel to the sides of the wall when the saddle structure is mounted on the wall;

a davit assembly mounted on the wall mounting assembly and configured to facilitate lifting of an item adjacent to a wall on which the wall mounting assembly is mounted;

wherein the saddle structure includes a primary portion, the primary portion including a primary plate member positionable adjacent to the upper edge of the wall when the wall mounting assembly is mounted on the wall; and wherein the davit assembly includes a stanchion structure for extending substantially vertically upwardly from the wall mounting assembly when the primary plate member is positioned adjacent to the upper edge of the wall, the stanchion structure extending substantially perpendicularly from the primary plate member at a position on the primary plate member such that the stanchion structure is positioned over the upper edge of the wall when the wall mounting assembly is mounted on the wall.

2. The apparatus of claim 1 wherein the saddle structure comprises:

a secondary portion positionable adjacent to the sides of the wall adjacent to the upper edge, the secondary portion including a pair of secondary members, each of the secondary members extending from the primary plate member to create the receiving space for receiving the portion of the wall adjacent to the upper edge, the secondary members being laterally spaced from each other such that each of the secondary members are positionable adjacent to one of the side surfaces of the wall when the wall mounting assembly is mounted on the wall, the primary plate member is positioned adjacent to the upper edge of the wall.

3. The apparatus of claim 2 wherein a first one of the secondary members extends from the primary member a distance different than a distance which a second one of the secondary members extends from the primary member.

4. The apparatus of claim 1 wherein the saddle structure is elongated between opposite ends for extending along a portion of a length the upper edge of the wall, the primary plate member being continuous from one of the opposite ends to another one of the opposite ends.

5. The apparatus of claim 1 wherein the davit structure comprises:

a jib structure mounted on the stanchion structure for extending substantially horizontally outward from the stanchion structure when the wall mounting assembly is mounted on a wall.

6. The apparatus of claim 5 wherein the stanchion structure is elongated along a stanchion axis which is substantially vertically oriented when the wall mounting assembly is mounted on a wall; and wherein the stanchion structure includes a base portion fixedly mounted on the wall mounting assembly and a post portion movably mounted on the base portion so as to be rotatable about the stanchion axis with respect to the base portion to rotate the jib structure with respect to the wall mounting assembly.

7. The apparatus of claim 5 wherein the jib structure has a proximal end adjacent to the stanchion structure and a distal end opposite the proximal end, a distance between the proximal and distal ends being adjustable.

8. The apparatus of claim 7 wherein the jib structure includes an inboard portion having the proximal end and an outboard portion having the distal end, the outboard portion being movable with respect to the inboard portion to adjust the distance between the proximal and distal ends of the jib structure.

9. The apparatus of claim 7 wherein the jib structure includes an inboard portion having the proximal end and an outboard portion having the distal end, the inboard and outboard portions having a telescopic relationship to adjust the distance between the proximal and distal ends of the jib structure.

10. The apparatus of claim 5 wherein the davit structure comprises an attachment structure attaching the jib structure to the stanchion structure, the attachment structure including a slot elongated in the direction of elongation of the saddle structure to permit a degree of adjustment of a position of the jib structure on the stanchion structure.

11. The apparatus of claim 5 wherein the davit structure comprises rigging support structure configured to support an elongate member with respect to the jib structure.

12. The apparatus of claim 11 wherein the rigging support structure includes an outboard pulley mounted on the outboard portion of the jib structure and an inboard pulley mounted on the inboard portion of the jib structure.

13. The apparatus of claim 11 wherein the davit structure comprises rigging operating structure configured to move the elongate member with respect to the rigging support structure.

14. The apparatus of claim 13 wherein the rigging operating structure includes:

a spool mounted for rotation with respect to elements of the stanchion structure;

a spool mount mounted on the stanchion structure; and a spool crank configured to rotate the spool with respect to the spool mount when the spool crank is operated by a user.

15. A system comprising:

a wall having an upper edge, a first side, and a second side;

a lifting apparatus removably mounted the wall and configured to transfer an item from a location on a first side of the wall to a location on a second side of the wall, the lifting apparatus comprising:

a wall mounting assembly removably mounted on a portion of the wall including and adjacent to the upper edge of the wall, the wall mounting assembly including a saddle structure configured to create a receiving space receiving the upper edge of the wall and a portion of the wall adjacent to the upper edge of the wall;

a davit assembly mounted on the wall mounting assembly and configured to facilitate lifting of an item adjacent to the wall on which the wall mounting assembly is mounted;

wherein the saddle structure being elongated between opposite ends, the saddle structure comprising:

a primary portion including a primary plate member positioned adjacent to the upper edge of the wall, the primary plate member being continuous between the opposite ends of the saddle structure;

a secondary portion including a pair of secondary plate members extending from the primary plate member in a laterally spaced arrangement with respect to each other to create a receiving space receiving the portion of the wall adjacent to the upper edge with each of the secondary plate members being positioned adjacent to one of the side surfaces of the wall, each of the secondary plate members being continuous between the opposite ends of the saddle structure; and wherein the davit assembly includes a stanchion structure extending substantially vertically upwardly from the wall mounting assembly, the stanchion structure extending substantially perpendicularly from the primary plate member at a position on the primary plate member such that the stanchion structure is positioned over the upper edge of the wall.

16. The system of claim 15 wherein the davit structure comprises:

a jib structure mounted on the stanchion structure for extending substantially horizontally outward from the stanchion structure when the wall mounting assembly is mounted on a wall.

17. The system of claim 16 wherein the stanchion structure is elongated along a stanchion axis which is substantially vertically oriented when the wall mounting assembly is mounted on a wall; and wherein the stanchion structure includes a base portion fixedly mounted on the wall mounting assembly and a post portion movably mounted on the base portion so as to be rotatable about the stanchion axis with respect to the base portion to rotate the jib structure with respect to the wall mounting assembly.

18. The system of claim 16 wherein the jib structure has a proximal end adjacent to the stanchion structure and a distal end opposite the proximal end, a distance between the proximal and distal ends being adjustable.

19. The system of claim 15 wherein the saddle structure is elongated between opposite ends for extending along a portion of a length the upper edge of the wall, the primary plate member being continuous from one of the opposite ends to another one of the opposite ends.

20. The system of claim 15 wherein the saddle structure is elongated in a direction extending parallel to the sides of the wall when the saddle structure is mounted on the wall; and wherein the davit structure comprises an attachment structure attaching the jib structure to the stanchion structure, the attachment structure including a slot elongated in the direction of elongation of the saddle structure to permit a degree of adjustment of a position of the jib structure on the stanchion structure.

* * * * *